United States Patent [19]
Laske

[11] 3,926,311
[45] Dec. 16, 1975

[54] PEEL-SEAL CONTAINERS
[75] Inventor: Louis Lawrence Laske, Grayslake, Ill.
[73] Assignee: Vonco Products, Inc., Lake Villa, Ill.
[22] Filed: Aug. 22, 1974
[21] Appl. No.: 499,621

[52] U.S. Cl.............. 206/439; 156/306; 229/48 T; 229/66; 428/202
[51] Int. Cl.² ........................................ A61B 19/02
[58] Field of Search....... 229/62, 66, 48 T; 206/438, 206/439, 440, 441, 63.3; 428/202; 156/306

[56] References Cited
UNITED STATES PATENTS

| | | | |
|---|---|---|---|
| 3,162,307 | 12/1964 | Regan, Jr. | 206/63.3 |
| 3,280,971 | 10/1966 | Regan, Jr. | 206/63.3 |
| 3,326,450 | 6/1967 | Langdon | 229/62 |
| 3,685,720 | 8/1972 | Brady | 229/62 |
| 3,754,700 | 8/1973 | Bonk | 206/439 X |

Primary Examiner—William Price
Assistant Examiner—Stephen P. Garbe
Attorney, Agent, or Firm—Thomas W. Speckman

[57] ABSTRACT

A peel-seal container which comprises a layer of spunbonded olefin material joined to an unsupported film of polyethylene or to a supported film of a laminated or coated backing, such as polyethylene coated mylar, to form a peel-seal packet, container or pouch. The spunbonded olefin material is first pretreated with a heated die in the areas that are to form the peel-seal with heat and pressure satisfactory to render uniform surface characteristics to the spunbonded olefin. The heat, pressure and dwell time are sufficient to eliminate the high spots and internal weaknesses of the spunbonded olefin material. A web of synthetic polymeric material having a heat sealable surface is then applied and a conventional heat sealing method is utilized. The resulting container has a highly reliable peel-seal which can be readily peeled without tearing of the spunbonded olefin material. The containers of this invention are particularly well suited for medical uses where high resistance to tearing upon opening, sterile conditions and at least one transparent face are required.

7 Claims, 3 Drawing Figures

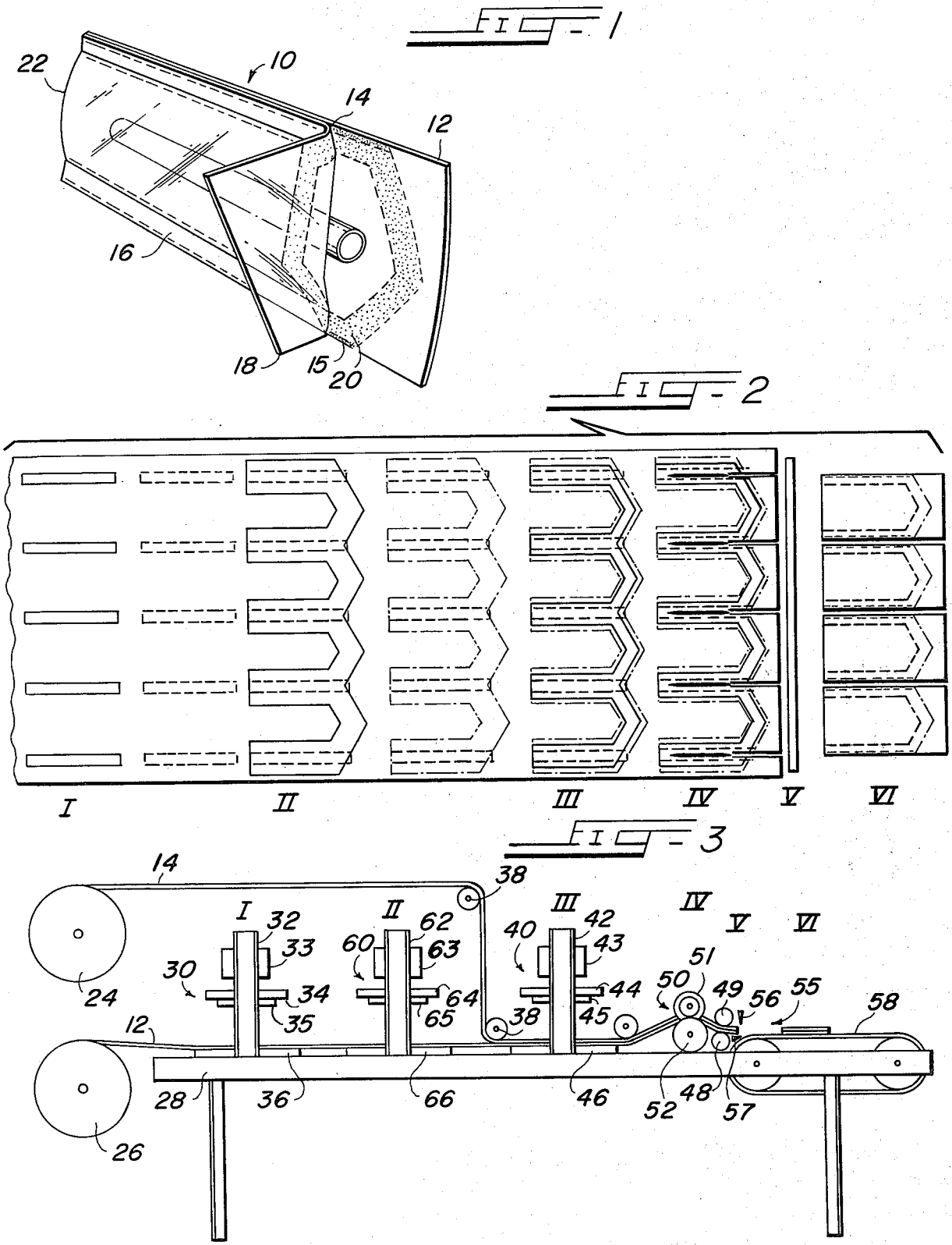

PEEL-SEAL CONTAINERS

PRIOR ART

Spunbonded olefin sheet such as sold under the registered trademark TYVEK by DuPont, have gained use for various types of containers. Spunbonded olefin sheets are tough, durable sheets of high-density polyethylene fibers. The sheets are formed by first spinning continuous strands of very fine interconnected fibers and then bonding them together with heat and pressure. The spunbonded olefin has high opacity and it is frequently desirable to have one side of the container transparent. Thus, it is desirable to produce containers with a transparent sheet such as polyethylene on one side and spunbonded olefin on the other. However, satisfactory peel-seals between the polyethylene and spunbonded olefin have not previously been obtained, especially with the required avoidance of tearing demanded for containers of sterilized medical goods without coating the spunbonded olefin.

When it is desired to make containers using the spunbonded olefin material on one side and a transparent material such as polyethylene on the other side, experience has shown that the sealing of polyethylene directly to the spunbonded polyolefin material using conventional sealing processes has caused difficulties. Specifically, upon opening the container by peeling the polyethylene sheet from the spunbonded olefin, the spunbonded olefin material is frequently fractured internally and separated, thus providing an unsatisfactory pouch, particularly for medical uses.

Prior methods that have been used to produce peel-seal containers using spunbonded olefin have involved coating spunbonded olefin material to provide a suitable sealing surface for the polyethylene. Coating of the spunbonded olefin material has been a problem due to the uneven surface characteristics and gauge variations of the spunbonded olefin material. The coating of the spunbonded olefin, however, does reduce tearing of the spunbonded olefin when peeled from polyethylene, but increases the cost and contamination problems.

Containers have been produced sealing polyethylene to uncoated spunbonded olefin, but fabrication is very difficult, there being a very narrow range of temperature, time and pressure tolerances. Some medical and other uses permit high levels (above about five percent) of spunbonded olefin tearing upon opening as results for commercial production according to prior methods of sealing polyethylene to uncoated spunbonded olefin. It is extremely difficult if not impossible to obtain an acceptably low level (below about five percent) of spunbonded olefin tearing upon opening such containers as demanded by many medical uses or other stringent uses where tearing or loose fibers is undesirable.

SUMMARY OF THE INVENTION

The container of this invention provides a peel-seal container or pouch which is highly reliable in providing extremely low incidence of tearing as demanded for medical uses and which can be produced at less cost than prior art methods.

Containers of this invention have a sheet of spunbonded olefin forming one side of a sheet of synthetic polymeric thermoplastic heat sealable material forming the other side and fastened to each other by a peel-seal. Satisfactory polymeric thermoplastic materials include unsupported polyethylene or may be a laminate such as polyethylene laminated to polyester or a heat seal coating such as polyethylene applied to nylon.

The method of manufacturing the container of this invention involves pretreatment of the spunbonded olefin material by applying a heated die, in the shape of at least a portion of the peel-seal desired, for a definite period of time at a pressure and a temperature satisfactory to permit the direct application of a heat-sealable polymeric film to the spunbonded olefin material by conventional heat sealing techniques. Usually it is not desirable to pretreat the whole area of spunbonded olefin since the pretreatment prevents the pouch from being breathable and thus easily sterilized.

A container or pouch may have a peel-seal area that extends to the edge of the pouch or it may stop at a distance inward from the edge of the pouch, about ⅛ inch, leaving the two sheets of material unsealed at the extreme edges. In the latter case, the spunbonded olefin sheet is not sealed to the transparent polymeric film sheet at the longitudinal edges when multiple pouches are made from webs of sheet material. In these instances, it is possible to pretreat the preseal area according to this invention at one station, providing an area which rapidly readily seals a heat sealable polymeric film to the spunbonded olefin sheet by conventional heat sealing techniques.

In the instance where it is desired for the peel-seal to extend to the edge of the pouch to avoid contamination and the like, the instances of the spunbonded olefin tearing upon opening are greatly increased. In these instances, it is preferred that a second pretreatment is performed, either before or after the overall peel-seal area pretreatment. The second pretreatment is applied to the longitudinal edge areas with slightly higher temperatures and higher pressures.

Generally, in the manufacture of pouches according to this invention, the pouches are made in multiples, that is, two or more pouches across the web of plastic. In these cases, the transparent polymeric sheet is usually sealed to the spunbonded olefin sheet prior to slitting and cutting the sheets into individual pouches. Thus, it is especially desirable to provide the second pretreatment to the areas which will be slit or cut after sealing when greatest resistance to tearing of the spunbonded olefin is desired.

It is also within this invention to provide only the second treatment to the slitting and cutting areas in cases where the prevention of tearing of the spunbonded olefin sheet is not of utmost importance.

The apparatus of this invention involves a pretreatment means for pretreatment of spunbonded olefin material in the area where the peel-seal is to be formed, which may include a first pretreatment station for treatment in the entire area of the peel-seal and a second pretreatment station for treatment at the edge and slitting and cutting areas and a sealing means where the heat-sealable polymeric film is joined in the pretreated peel-seal area to the spunbonded olefin material by conventional heat sealing techniques. Following that operation the containers may be slit and cut into the desired package, containers or pouches.

The container of this invention made by the process and apparatus of this invention provides a very acceptable medical type of pouch for containing a large variety of items. The container of this invention may also be used for packaging any other desired article.

REFERENCE TO THE DRAWINGS

FIG. 1 is a perspective of a partially opened container of this invention;

FIG. 2 is a schematic top view of material as it proceeds through the apparatus of FIG. 3 to produce containers of this invention; and FIG. 3 is a side view of an apparatus to form containers of this invention.

DESCRIPTION

Referring to the drawings in FIG. 1 it will be seen that the container 10 of this invention results from the operation of the method of this invention utilizing the apparatus of this invention. Container 10 comprises a sheet of spunbonded olefin material 12, such as TYVEK, a sheet of synthetic polymer material 14, for example polyethylene, a peel-seal area 16, and a peel flap 18 which provides the mechanism by which the person opening the container can grip the two layers and separate them along the area of the peel-seal.

It will be seen in FIG. 1 at the area indicated by 20 that the characteristics of the surface of spunbonded olefin sheet 12 have been modified by pretreatment in an amount sufficient so that utilizing conventional heat sealing techniques, sheet 14 can be sealed to the spunbonded olefin sheet to provide the peel-seal 16. The longitudinal edges have been pretreated at a higher temperature-time-pressure relationship shown as 15.

Open end 22 illustrates one way in which the container of this invention may be produced. It should be understood that the end 22 may be left open in order that the materials to be packaged can be inserted into the containers and then sealed. It is also within the scope of this invention to insert the material to be packaged prior to the time of the formation of the peel-seal so that end 22 can be closed at the same time and in the same manner as is the remainder of the peel-seal.

Referring to FIG. 3, it will be seen that roll 24 of material 14 is provided mounted on suitable support, along with another roll 26 of spunbonded olefin material 12. Rolls 24 and 26 are mounted with suitable unwind mechanisms at the end of machine frame 28. Pretreatment station I shows pretreatment means 30 comprising base 36 having attached to it frame 32 with drive mechanism 33 and platen 34 holding die 35. The shape of the portion of die 35 which contacts the web of material 12 is the shape that is desired for the area of pretreatment. Pretreatment station II, FIG. 3, shows pretreatment means 60 comprising base 66 having attached to it frame 62 with drive mechanism 63 and platen 64 holding die 65.

In FIG. 2, the stations denoted by Roman numerals with respect to the web of plastic correspond to the stations denoted in FIG. 3. Pretreatment station I imparts the pretreatment at the slitting areas and extreme edges of the finished pouches. As explained above, the temperature-time-pressure relation is such to give increased pretreatment in the pretreatment area shown in station I than in the overall pretreatment area. A suitable die shape to obtain the desired pretreatment area is readily apparent to one skilled in the art.

As shown in FIG. 2, pretreatment station II imparts the desired pretreatment to spunbonded olefin over the entire peel-seal area. The temperature-time-pressure relation at pretreatment station II is less than that used at pretreatment station I.

While FIGS. 2 and 3 show two pretreatment stations, it should be understood that this invention encompasses the use of either pretreatment station I or pretreatment station II alone, and the combination of pretreatment stations I and II. Also, it should be understood that it is within this invention to reverse the sequence of pretreatment stations I and II.

Further, while the treatment and sealing dies are shown in FIG. 3 to be reciprocating, it should be understood that this invention includes like dies being mounted on cylinders.

The second layer of material 14 that is to be bonded to the first layer 12 is guided into position from roll 24 by a pair of guide rolls 38 in order that it can be positioned in juxtaposition under sealing means 40 at sealing station III. Sealing station III shows sealing means 40 comprising base 46 having attached to it frame 42 with drive mechanism 43 and platen 44 holding sealing die 45. Again, while sealing die, as shown in FIG. 3, is reciprocating, it can also be rotary. Sealing station III provides suitable heat and pressure to seal the desired areas of the sheets together under conventional conditions of heat sealing polymeric material such as polyolefins.

Slitting station IV shows slitting means 50 comprising rollers 51 and 52 which longitudinally slits the moving web in the desired locations as shown in FIG. 2 at station IV.

Draw rollers 48 and 49 draw the plastic webs through the machine with indexing controlled by electric eye or mechanical measuring. After passing through draw rollers 48 and 49 the plastic web passes through shearing station V having shearing means 55 comprising knife 56 and anvil 57. At shearing station V containers are cut transversely and may be collected by any suitable means such as conveyor 58. The finished pouches are shown in FIG. 2 at station VI corresponding to the conveyor means.

The process of this invention comprises drawing a web of spunbonded olefin material to a pretreatment station. At the pretreatment station the spunbonded olefin sheet is treated in one or both of two pretreatment operations by subjecting the peel-seal area of the spunbonded olefin to heat and pressure for a time sufficient to render the peel-seal area susceptible to conventional heat sealing to a second polymeric thermoplastic sheet material.

One pretreatment of this invention is with suitable pressure and heat to the whole area to be sealed. It has been found for pretreatment of spunbonded olefin sheets of 0.008 inch thickness and density of about 2.2 ounces per 1000 square inches, that temperatures of about 265° to about 290°F. are suitable for this pretreatment with a dwell time of about three-quarter to about two seconds at a pressure of about 40 to about 80 psig. The temperature-time-pressure treatment parameters may be changed somewhat with differing thicknesses or densities of the spunbonded olefin sheet. These adjustments may be readily ascertained to achieve desired pretreatment. When the higher temperature is used the time and/or pressure components should be reduced and conversely when the temperatures are in the lower portion of the range, higher times and/or pressures are suitable. It has been found especially suitable to use for the entire seal area pretreatment a temperature of about 280°F., dwell time about 1.8 seconds and pressure about 50 psig. The pretreatment as disclosed in this paragraph is achieved in pretreatment station II shown in FIGS. 2 and 3.

Another pretreatment of this invention is with suitable pressure and heat to the areas of the spunbonded olefin which form the longitudinal edges of the final container. It has been found for pretreatment of spunbonded olefin sheet of about 0.008 inch thickness and density of about 2.2 ounces per 1000 square inches that temperatures of about 275° to about 300°F. are suitable for this pretreatment with a dwell time of about one-half to about two seconds at a pressure of about 60 to about 100 psig. The temperature-time-pressure treatment parameters may be changed somewhat with differing thicknesses or densities of the spunbonded olefin sheet. These adjustments may be readily ascertained to achieve desired pretreatment. When the higher temperature is used the time and/or pressure components should be reduced and conversely when the temperatures are in the lower portion of the range, higher times and/or pressures are suitable. It has been found especially suitable to use for the edge pretreatment a temperature of about 290°F., dwell time about 1.5 seconds and pressure about 70 psig. The pretreatment as disclosed in this paragraph is achieved in pretreatment station I shown in FIGS. 2 and 3.

The two pretreatments are preferred to produce peel-seal containers with the minimum incidence of tearing the spinbonded olefin upon opening. Containers according to this invention having the above pretreatments have shown an incidence of tearing of the spunbonded olefin visible to the naked eye of less than three percent. Previous to this invention, I have found uncoated spunbonded olefin sheet sealed to polyethylene produced tearing upon opening peel-seals with a frequency much higher than acceptable for medical containers.

It should be understood that, though the use of unsupported polyethylene film is described in the above specific examples as the material 14, that anything which can be heat sealed to spunbonded olefin, such as a coated polyethylene, can also be used as within the teachings of this invention.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A peel-seal container comprising a first layer of uncoated spunbonded olefin material and a second layer of synthetic polymeric thermoplastic material, said two layers being peelably joined together in an area along the longitudinal edges of the said container and across at least one end portion at an area removed from that one end, a peel flap formed at said one end by said layers overlying each other without being joined together, said first uncoated spunbonded olefin layer having its surface modified in the area of said peelable seal by pretreatment with heat and pressure to eliminate the high spots and internal weaknesses to render said sealing area susceptible to having said second layer peelably joined thereto by conventional heat-pressure sealing.

2. The peel-seal container of claim 1 wherein said pretreatment is performed at temperatures of about 265° to about 290°F. with a dwell time of about three-quarter to about 2 second at a pressure of about 40 to about 60 psig to the entire peel-seal area.

3. The peel-seal container of claim 1 wherein said pretreatment is performed at temperatures of about 275° to about 300°F. with a dwell time of about one-half to about 2 seconds at a pressure of about 60 to about 100 psig to the peel-seal area at the edges of the container.

4. The peel-seal container of claim 1 wherein said pretreatment is performed at temperatures of about 265° to about 290°F. with a dwell time of about three-quarter to about 2 seconds at a pressure of about 40 to about 60 psig to the entire peel-seal area and at temperatures of about 275° to about 300°F with a dwell time of about ½ to about 2 seconds at a pressure of about 60 to about 100 psig to the peel-seal area at the edges of the container.

5. The peel-seal container of claim 1 wherein said pretreatment is performed to both longitudinal edges of said container.

6. The peel-seal container of claim 1 wherein said peel-seal along the longitudinal edges of said container stops at a distance inward from the edges of said container leaving the two sheets of said material unsealed at the edges.

7. The peal-seal container of claim 1 wherein said second layer is polyethylene.

* * * * *